UNITED STATES PATENT OFFICE.

EDWIN W. BE VIER, OF CHANDLERVILLE, ILLINOIS.

HOG-CHOLERA REMEDY.

SPECIFICATION forming part of Letters Patent No. 282,949, dated August 14, 1883.

Application filed January 22, 1883. (No specimens.)

*To all whom it may concern:*

Be it known that I, EDWIN W. BE VIER, a citizen of the United States, residing at Chandlerville, in the county of Cass and State of Illinois, have invented certain new and useful Improvements in Medical Compounds to be Used for the Cure of Hog-Cholera, of which the following is a specification.

My composition consists of the following ingredients combined in about equal proportions, viz: tobacco and the root of the mandrake, or podophyllum-plant, or "may-apple," as it is commonly named. These ingredients are to be mingled or mixed by any suitable means.

In using the foregoing compound I mix it with bran and water sufficient to make a slop that hogs will readily eat, and give it in quantities of about two ounces of the compound to each hog per day, until a cure is effected.

The relative proportions of the may-apple root and the tobacco may vary considerably; but I have found the equal proportions, as hereinbefore named, to be very effective.

Other material than bran and water may be used as a vehicle for the administration of my compound; but this vehicle is found to be a good one.

What I claim, and desire to secure by Letters Patent of the United States, is—

The herein-described medical compound as a hog-cholera remedy, consisting of tobacco and may-apple root in the proportions specified.

In testimony whereof I affix my signature in presence of two witnesses.

EDWIN W. BE VIER.

Witnesses:
 M. C. LETTLE,
 L. C. CHANDLER.